United States Patent [19]

Schempp et al.

[11] Patent Number: 5,748,821

[45] Date of Patent: May 5, 1998

[54] ADAPTER ASSEMBLY FOR FIBER OPTIC CONNECTORS

[75] Inventors: Otto Schempp, Bad Rappenau; Francesco Carabetta, Hassmersheim, both of Germany

[73] Assignee: Molex Incorporated, Lisle, Ill.

[21] Appl. No.: 668,658

[22] Filed: Jun. 25, 1996

[30] Foreign Application Priority Data

Aug. 9, 1995 [EP] European Pat. Off. ............... 95112497

[51] Int. Cl.⁶ ........................................................ G02B 6/36
[52] U.S. Cl. ............................. 385/76; 385/59; 385/136
[58] Field of Search ................................... 385/59, 60, 65, 385/66, 71, 72, 76, 78, 84, 136

[56] References Cited

U.S. PATENT DOCUMENTS

| | | | |
|---|---|---|---|
| 5,123,071 | 6/1992 | Mulholland et al. | 385/53 |
| 5,245,683 | 9/1993 | Belenkiy et al. | 385/69 |
| 5,268,982 | 12/1993 | Schaffer et al. | 385/86 |
| 5,293,581 | 3/1994 | DiMarco | 385/76 |
| 5,315,679 | 5/1994 | Baldwin et al. | 385/76 |
| 5,343,547 | 8/1994 | Palecek et al. | 375/76 |
| 5,398,295 | 3/1995 | Chang et al. | 385/58 |
| 5,475,781 | 12/1995 | Chang et al. | 385/76 |

FOREIGN PATENT DOCUMENTS

WO 94/17433  8/1994  WIPO .................. H01R 13/518

*Primary Examiner*—John Ngo
*Attorney, Agent, or Firm*—A. A. Tirva

[57] ABSTRACT

An adapter assembly is provided for holding two individual fiber optic connectors in generally parallel side-by-side alignment. The assembly includes a body having a pair of through passages adapted for holding the fiber optic connectors in an substantially side-by-side relationship when the connectors are inserted in an axial direction into the passages. The passages are transversely enlarged relative to the respective connectors to provide floating motion between the connectors and the body. A holding clip is insertable into a transverse opening in the body into engagement with each connector. The holding clip retains its respective connector in its respective passage in the body. The holding clip is configured to allow the floating motion between the connectors and the body.

6 Claims, 3 Drawing Sheets

5,748,821

ADAPTER ASSEMBLY FOR FIBER OPTIC CONNECTORS

FIELD OF THE INVENTION

This invention generally relates to the art of fiber optic connectors and, particularly, to an adapter assembly for holding a pair of individual fiber optic connectors.

BACKGROUND OF THE INVENTION

Fiber optic devices use single or multiple strands of fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together. Additionally, several transmission lines can be arranged in parallel for the simultaneous transmission of information along each of the separate lines.

Originally, fiber optic systems utilized simplex interconnection systems with single connector plugs terminating single fiber optic cables. In a simplex system, either transmission or reception of information can take place at one time. Consequently, simplex systems are limited in the amount of information that they can transmit and receive during a given period of time.

To increase the amount of information that can be communicated over fiber optic systems, multi-channel systems were developed. Such multi-channel systems include, for example, duplex connector plugs and cables which are capable of simultaneous transmission and reception. Thus, using a duplex system enables information to be transmitted at a much higher rate.

Despite the advantages, multi-channel fiber optic systems are relatively new, and many simplex systems and parts are already in use, for example, ST and SC type connectors. Consequently, simplex parts are readily available and less expensive because there is an existent inventory. Moreover, it would be difficult if not cost prohibitive to retrofit existing simplex systems with dedicated duplex or other multi-channel parts. Consequently, a need exists for an interconnection system which is compatible with both simplex and duplex parts and which permits the interconnection of simplex parts in a duplex configuration to provide duplex data transmission. Several designs have been proposed to address this problem. Typically, they involve an adapter structure which clamps on two individual connector housings to hold the two connectors in a side-by-side relationship forming a duplex connector.

The present invention is directed to providing an improved, more reliable adapter structure or assembly for holding a pair of connectors in a side-by-side relationship and ensuring that the connectors are maintained in a generally parallel relationship.

SUMMARY OF THE INVENTION

An object, therefore, of the invention is to provide a new and improved adapter assembly for holding two individual fiber optic connectors in generally parallel side-by-side alignment.

In the exemplary embodiment of the invention, the adapter assembly includes a body having a pair of through passages adapted for holding the fiber optic connectors in a substantially side-by-side relationship when the connectors are inserted in an axial direction into the passages. The passages are transversely enlarged relative to the respective connectors to provide floating motion between the connectors and the body. A holding clip is insertable through a transverse opening in the body into engagement with each connector. Complementary interengaging retention means are provided between each holding clip and its respective connector to hold the connector in its respective passage in the body. The retention means are configured to allow the floating motion between the connector and the body.

More particularly, the complementary interengaging retention means are provided by a groove on each opposite side of each connector extending transversely of the axial direction. The holding clip is generally U-shaped defining a pair of leg portions insertable into the grooves on opposite sides of the respective connector. The grooves are enlarged relative to the leg portions to allow the floating motion between the connectors and the body.

Lastly, complementary interengaging latch means are provided between each leg portion of the U-shaped holding clip and the body to lock the clip in position holding the respective connectors in their passages.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
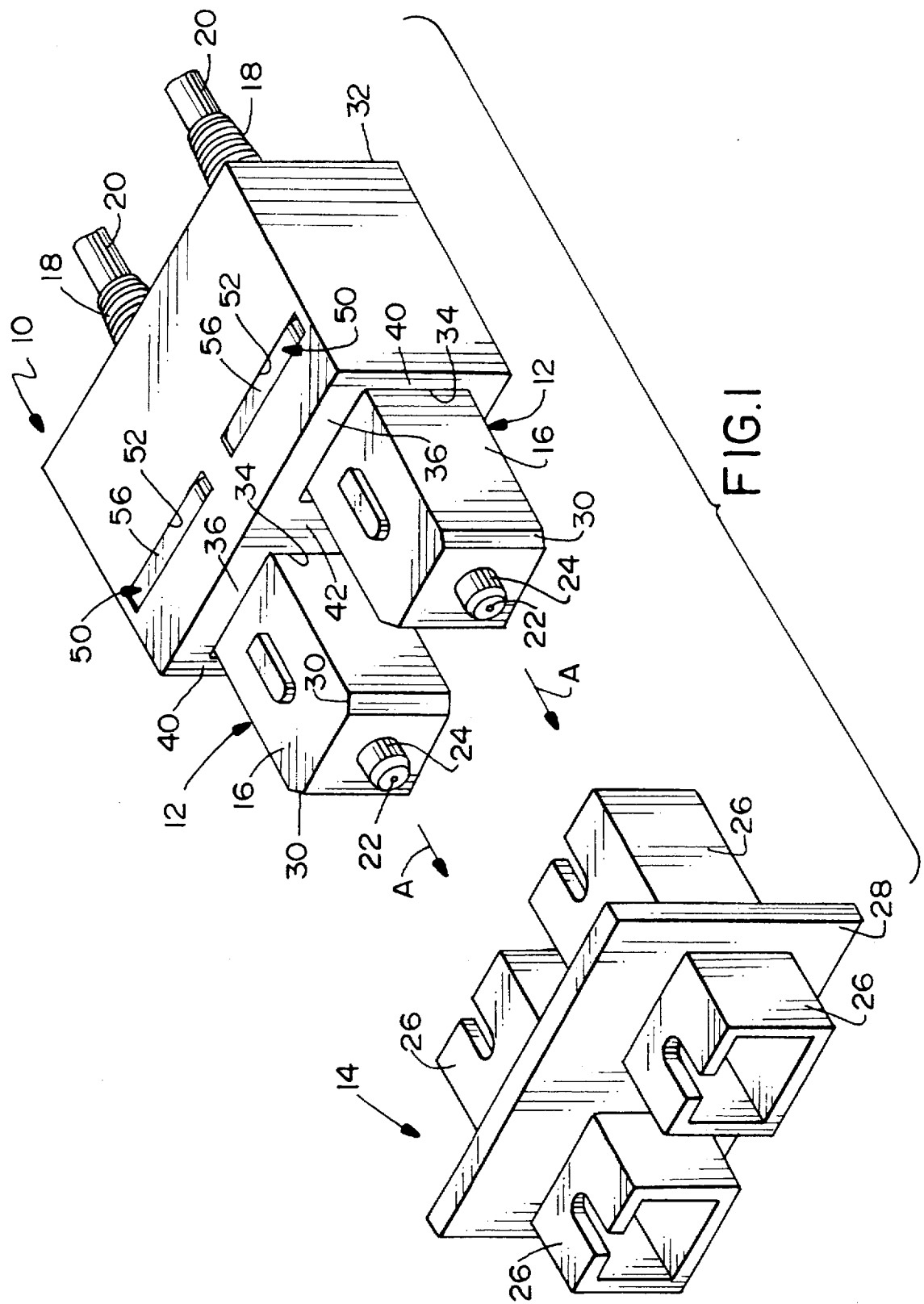
FIG. 1 is a perspective view of an adapter assembly according to the invention and holding two individual fiber optic connectors, in conjunction with a duplex receptacle for the connectors.

Referring to the drawings in greater detail, and first to FIG. 1, the invention is incorporated in an adapter assembly, generally designated 10, for holding two individual fiber optic connectors, generally designated 12, in generally parallel side-by-side alignment so that the connectors can be easily inserted into a duplex receptacle, generally designated 14, or other duplex connecting device. Each fiber optic connector 12 includes a generally rectangular housing 16 with a boot 18 projecting from the rear thereof for embracing a fiber optic cable 20. As stated in the "Background", above, each fiber optic cable includes an inner circular glass core 22 surrounded by a circumferential cladding. The cores are shown in FIG. 1 centered within ferrules 24 of the fiber optic connectors.

As stated above, adapter assembly 10 is designed for holding connectors 12 in generally parallel side-by-side alignment for easy insertion of the connectors into duplex receptacle 14. The receptacle has a pair of rectangular sockets 26 on opposite sides of a flange 28. Connectors 12 are inserted into the sockets on the right-hand side of flange 28 in the direction of arrows "A". The front edges or corners of the housings 16 are chamfered, as at 30, to facilitate guiding the connectors into the sockets of duplex receptacle 14. A second pair of connectors or other complementary connecting devices are inserted into sockets 26 on the left-hand side of flange 28 of duplex receptacle 14 for mating with connectors 12. When mated, light is transmitted along cores 22 to and from the connectors and the mating connecting devices.

Figure 2:
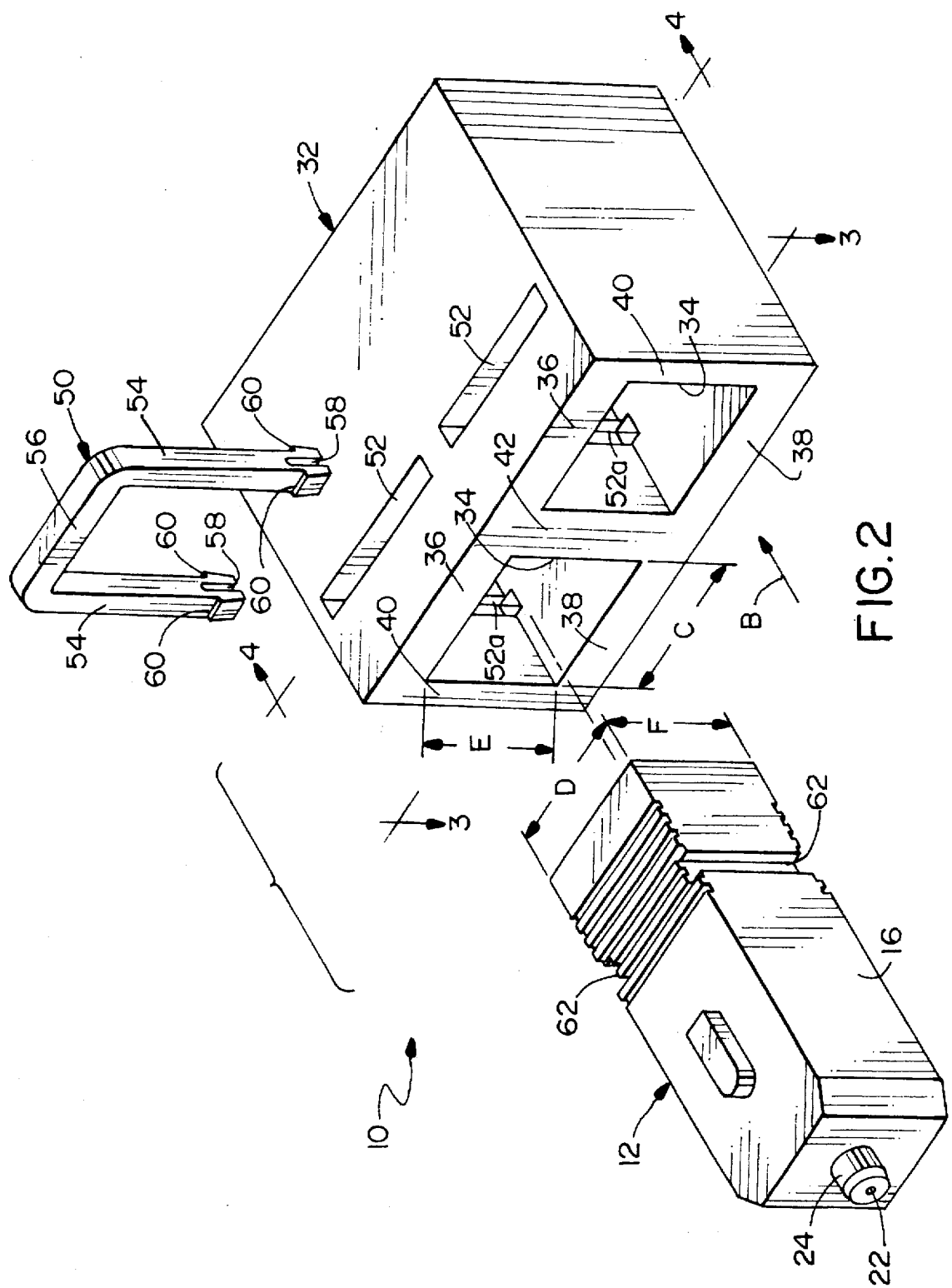
FIG. 2 is an exploded perspective view of the adapter assembly, but showing only one of the two connectors, along with only one of the holding clips.

Referring to FIG. 2 in conjunction with FIG. 1, adapter assembly 10 includes a body, generally designated 32, which has a pair of rectangular or box-shaped passages 34. Body 32 is a unitary structure which can be integrally molded of plastic material. Passages 34 are adapted for holding fiber optic connectors 12 in a substantially side-by-side relationship when the connectors are inserted axially into passages 34 in the direction of arrow "B" (FIG. 2). When the connectors are inserted as shown in FIG. 1, body 32 substantially entirely surrounds the connectors within passages 34. In particular, each passage includes a top wall 36, a bottom wall 38 and an outside wall 40. Both passages share a common inside wall 42 which defines a partition between the passages.

Generally, means are provided to allow floating motion between connectors 12 and body 32 transversely of the axial direction of insertion of the connectors into the body as indicated by arrow "B". In particular, passages 34 in the body are transversely enlarged relative to the respective connectors to provide floating motion between the connectors and the body. Referring to FIG. 2, the horizontal dimension "C" of each passage 34 is sufficiently larger than dimension "D" of each connector 12, and vertical dimension "E" of each passage is sufficiently larger than dimension "F" of each connector to provide the floating motion.

Figure 3:
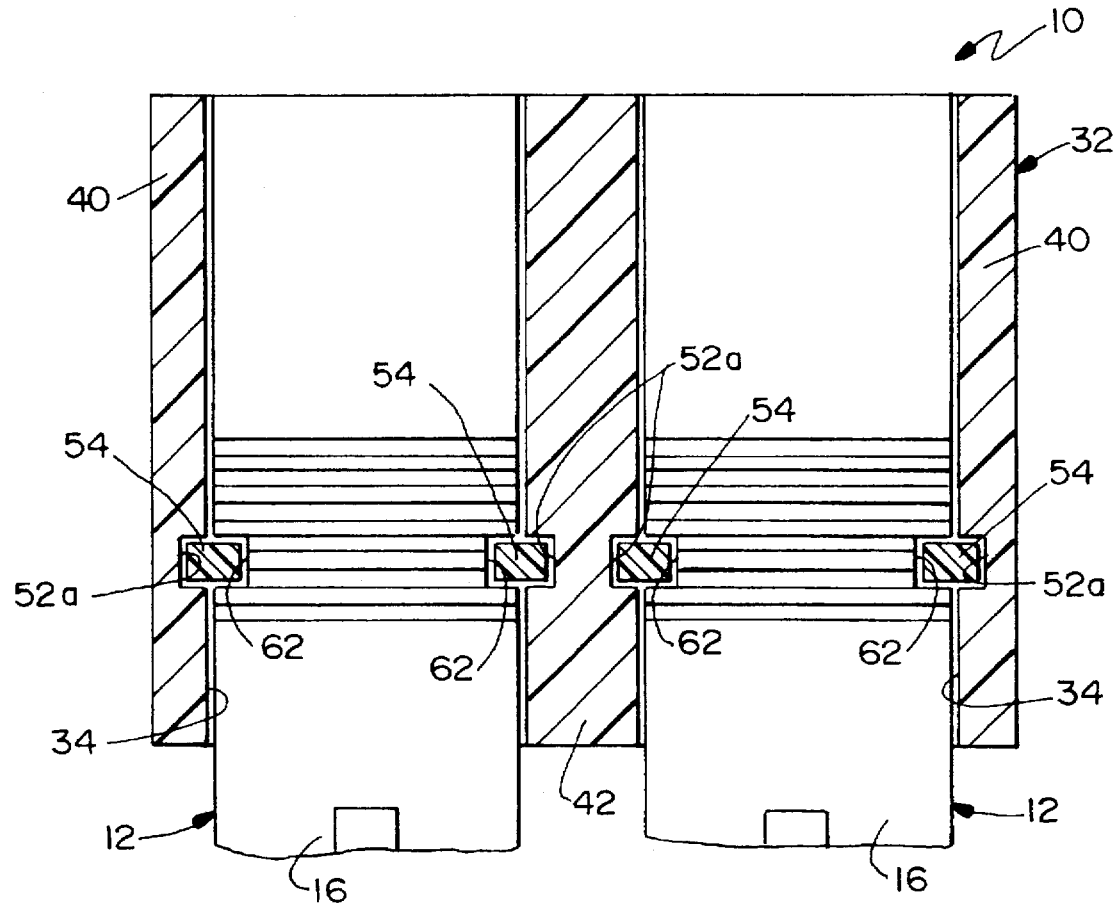
FIG. 3 is a horizontal section taken generally along line 3—3 in FIG. 2.
Figure 4:
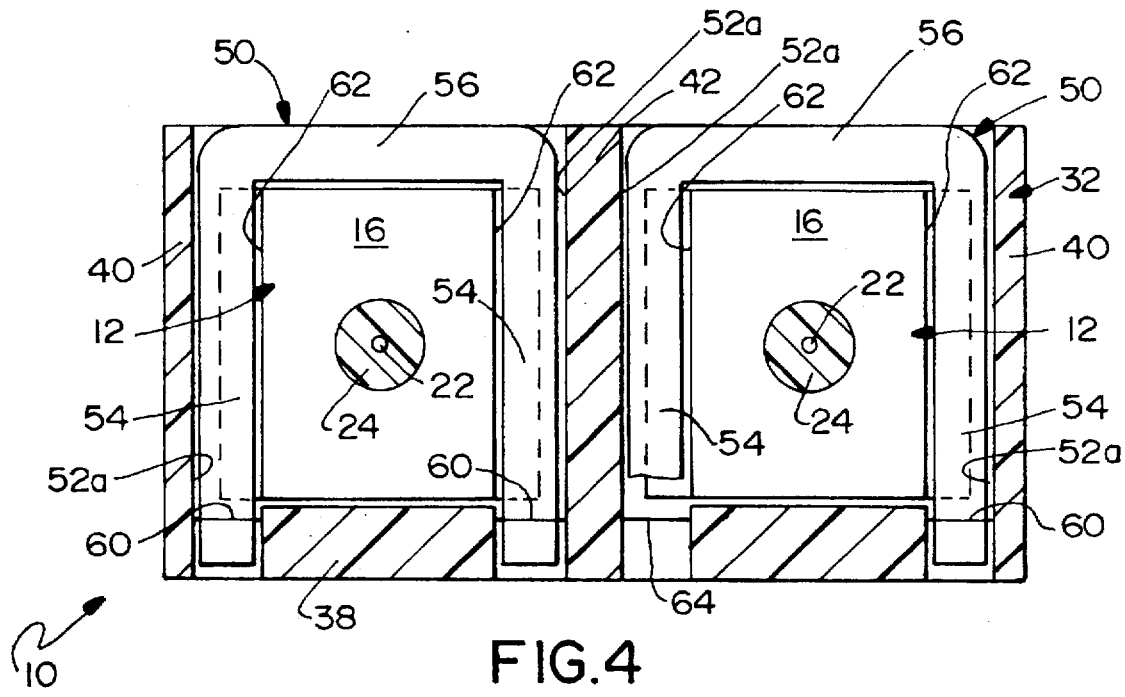
FIG. 4 is a vertical section taken generally along line 4—4 in FIG. 2.

Referring to FIGS. 3 and 4 in conjunction with FIGS. 1 and 2, a holding clip, generally designated 50, is insertable into a transverse opening 52 in body 32 and into engagement with each connector 12. Each clip is generally U-shaped to define two leg portions 54 joined by a bight portion 56. The distal end of each leg portion 54 is bifurcated or split, as at 58, to provide resiliency thereat. Opposite sides of each leg portion include latch flanges 60 for engaging appropriate latch shoulders within body 32 to lock the clip in position holding a respective connector in its passage.

Generally, complementary interengaging retention means are provided between each holding clip 50 and its respective connector 12 to hold the connector in its respective passage 34 in body 32. This means is provided by a pair of recesses or grooves 62 in opposite sides of each connector housing 16 as best seen in FIG. 2. The grooves receive leg portions 54 of one of the retention clips 50 as best seen in FIGS. 3 and 4. Each opening 52 in body 32 also includes a pair of vertical recesses or groove portions 52a on opposite sides of passages 34 in walls 40 and 42 of the body. Lastly, FIG. 4 shows latch shoulders 64 within body 32 for engaging latch flanges 60 at the distal ends of leg portions 54 of holding clips 50.

The complementary interengaging retention means between each holding clip 50 and its respective connector 12 are configured to allow the floating motion afforded between the connectors and body 32. In particular, grooves 62 in the sides of each connector 12 and/or grooves 52a in the opposite sides of passages 34 of housing 32 are enlarged relative to leg portions 54 of holding clips 50 to allow the aforesaid floating motion between the connectors and the body.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An adapter assembly for holding two individual fiber optic connectors in generally parallel side-by-side alignment, comprising:

a body having a pair of through passages adapted for holding said fiber optic connectors in a substantially side-by-side relationship when the connectors are inserted in an axial direction into the passages, the passages being transversely enlarged relative to the respective connectors to provide floating motion between the connectors and the body;

a holding clip insertable into a transverse opening in the body into engagement with each connector; and complementary interengaging retention means between each holding clip and its respective connector to hold the connector in its respective passage in the body, the retention means being configured to allow said floating motion between the connectors and the body.

2. The adapter assembly of claim 1 wherein said retention means include a recess in each connector for receiving a portion of a respective holding clip, the recess being enlarged relative to said portion to allow said floating motion.

3. The adapter assembly of claim 2 wherein said recess comprises a groove extending transversely of said axial direction for receiving a leg portion of the respective holding clip.

4. The adapter assembly of claim 3, including one of said grooves on each opposite side of each connector, and each holding clip is generally U-shaped defining a pair of leg portions insertable into the grooves on opposite sides of the respective connector.

5. The adapter assembly of claim 4, including complementary interengaging latch means between at least one leg portion of each holding clip and the body to lock the clip in position holding the respective connector in its passage.

6. The adapter assembly of claim 1, including complementary interengaging latch means between the holding clip and the body to lock the clip in position holding the respective connector in its passage.

* * * * *